US008678847B2

(12) United States Patent
Inoue et al.

(10) Patent No.: US 8,678,847 B2
(45) Date of Patent: Mar. 25, 2014

(54) POWER PLUG LOCKING DEVICE HAVING A MANUAL UNLOCK SWITCH AND A LOCK MEMBER ACTIVATED BY A DRIVE SOURCE ACTIVATED BY AN UNLOCK CIRCUIT

(75) Inventors: Tomohiro Inoue, Aichi (JP); Keigo Nishimoto, Aichi (JP)

(73) Assignee: Kabushiki Kaisha Tokai Rika Denki Seisakusho, Aichi-Ken (JP)

( * ) Notice: Subject to any disclaimer, the term of this patent is extended or adjusted under 35 U.S.C. 154(b) by 31 days.

(21) Appl. No.: 13/611,482

(22) Filed: Sep. 12, 2012

(65) Prior Publication Data

US 2013/0078840 A1 Mar. 28, 2013

(30) Foreign Application Priority Data

Sep. 28, 2011 (JP) ................................. 2011-212661

(51) Int. Cl.
*H01R 13/627* (2006.01)
(52) U.S. Cl.
USPC ......................................................... 439/352
(58) Field of Classification Search
USPC .......................................... 439/352–358, 310
See application file for complete search history.

(56) References Cited

U.S. PATENT DOCUMENTS

| 6,371,768 | B1* | 4/2002 | Neblett et al. | 439/34 |
| 8,206,172 | B2* | 6/2012 | Katagiri et al. | 439/352 |
| 8,317,534 | B2* | 11/2012 | Osawa et al. | 439/353 |
| 8,357,001 | B2* | 1/2013 | Katagiri et al. | 439/304 |
| 8,523,589 | B2* | 9/2013 | Kurumizawa et al. | 439/304 |
| 8,523,596 | B2* | 9/2013 | Inoue et al. | 439/352 |
| 2012/0234061 | A1 | 9/2012 | Inoue et al. | |

FOREIGN PATENT DOCUMENTS

| JP | 9-161898 | 6/1997 |
| JP | 2009-008917 | 1/2009 |

* cited by examiner

*Primary Examiner* — Chandrika Prasad
(74) *Attorney, Agent, or Firm* — Greenblum & Bernstein, P.L.C.

(57) ABSTRACT

A power plug locking device arranged in a vehicle includes a lock member moved between a lock position, in which the lock member prohibits removal of a power plug from a vehicle inlet, and an unlock position, in which the lock member permits removal of the power plug from the vehicle inlet. A drive source is activated to move the lock member from the lock position to the unlock position. An unlock switch is manually operated to move the lock member to the unlock position. An unlock circuit activates the drive source to move the lock member to the unlock position when the operation of the unlock switch and an unlock state of a vehicle door are both detected.

7 Claims, 8 Drawing Sheets

Fig.2
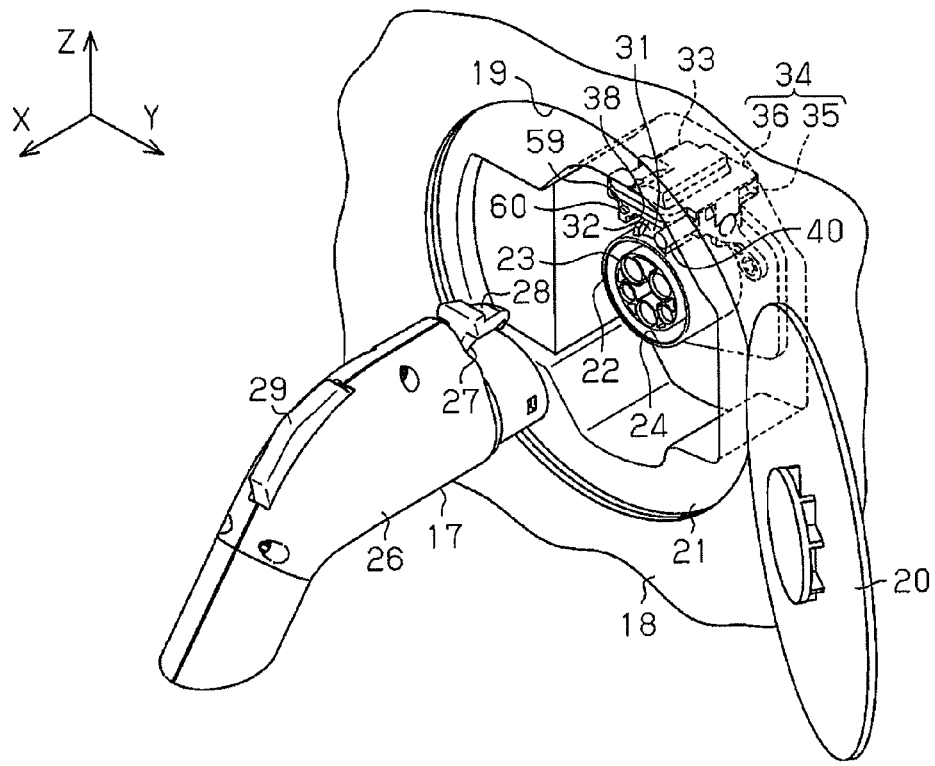
Fig.3A
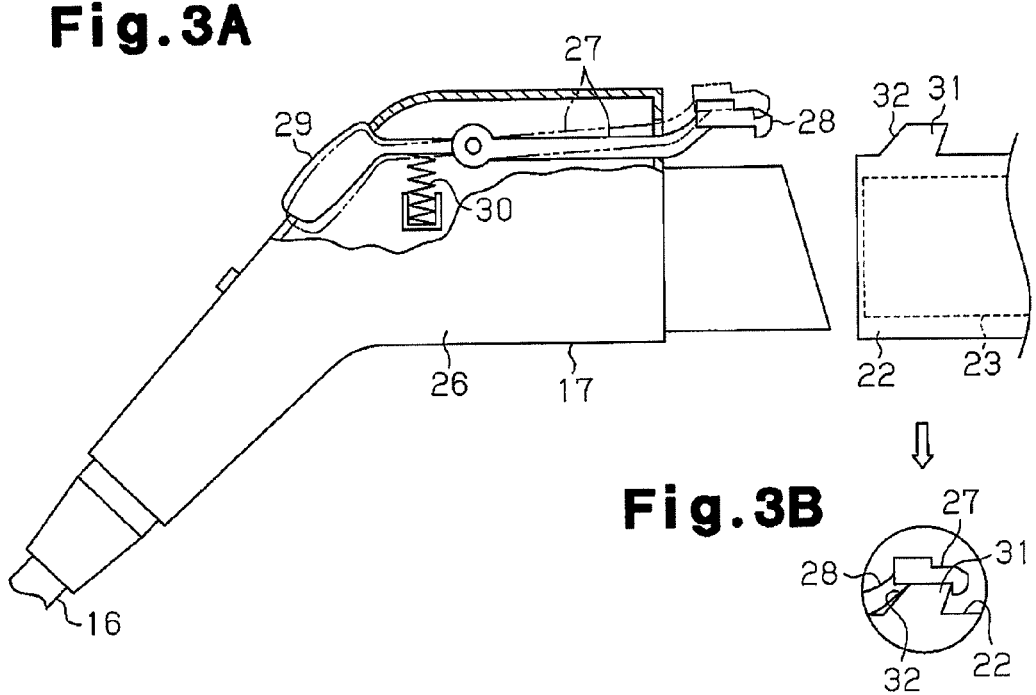
Fig.3B

Unlock State

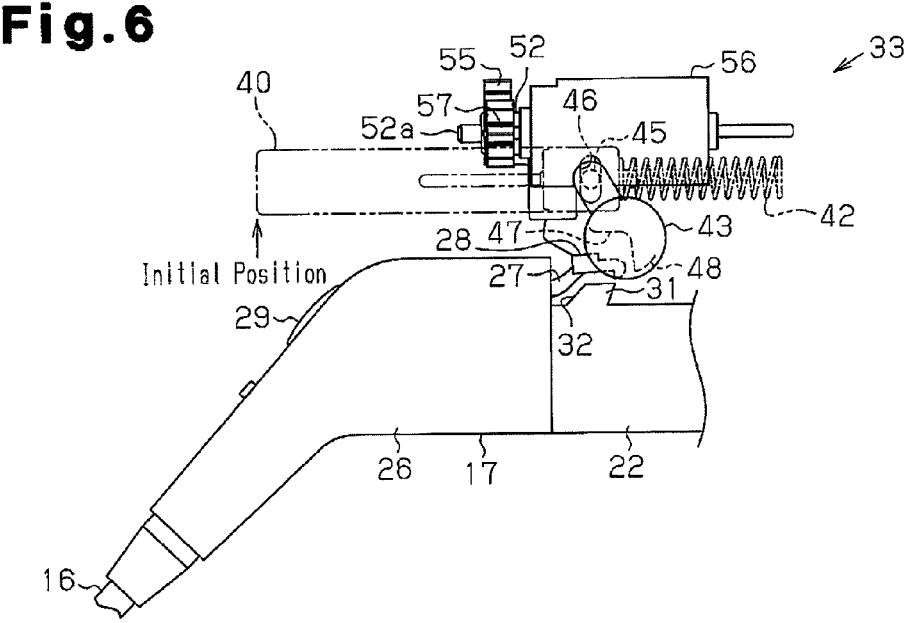
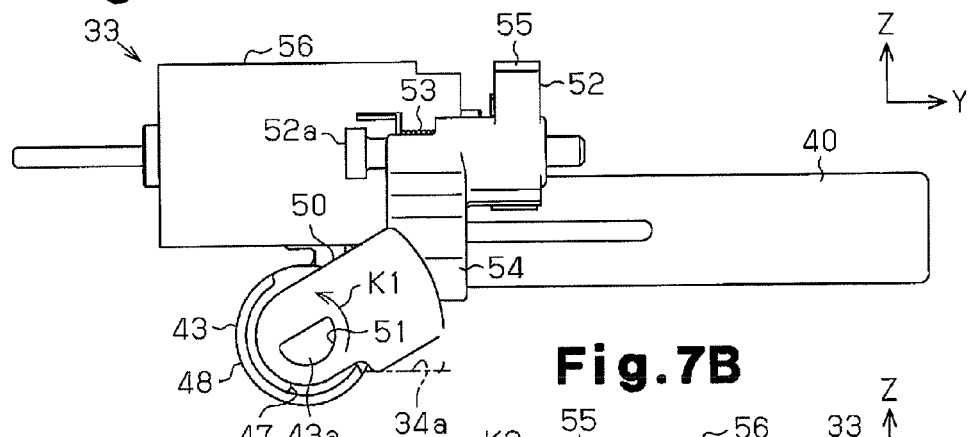
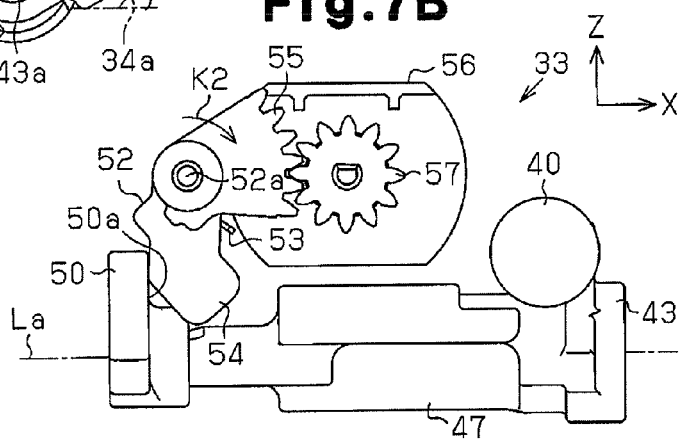

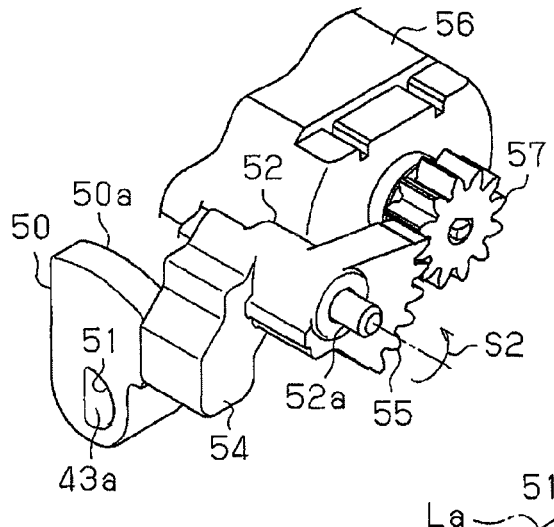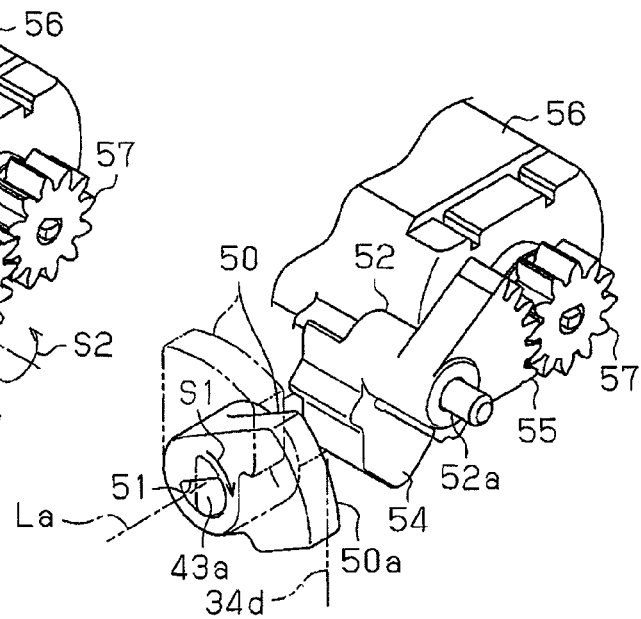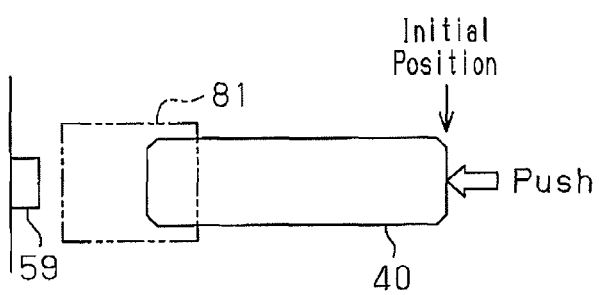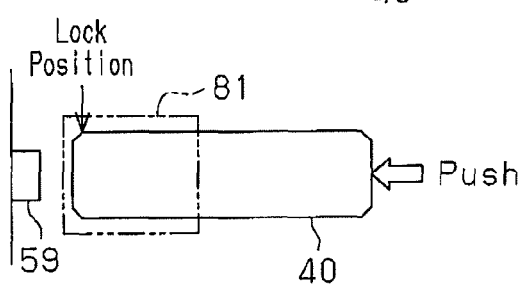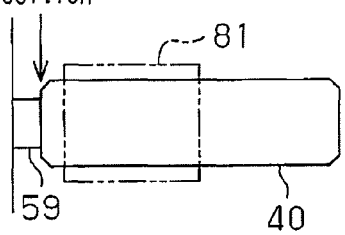

Unlock State

Lock State

POWER PLUG LOCKING DEVICE HAVING A MANUAL UNLOCK SWITCH AND A LOCK MEMBER ACTIVATED BY A DRIVE SOURCE ACTIVATED BY AN UNLOCK CIRCUIT

CROSS-REFERENCE TO RELATED APPLICATIONS

This application is based upon and claims the benefit of priority from prior Japanese Patent Application No. 2011-212661, filed on Sep. 28, 2011, the entire contents of which are incorporated herein by reference.

FIELD

The present invention relates to a power plug locking device that prevents unauthorized removal of a power plug.

BACKGROUND

Vehicles powered by motors, such as hybrid vehicles and electric vehicles, have become popular. Such a motor is powered by a rechargeable battery that is charged whenever the state of charge becomes low (refer to Japanese Laid-Open Patent Publication No. 9-161898).

Battery charging is performed by connecting a power plug to the vehicle. The charging requires a relatively long period of time. Accordingly, Japanese Laid-Open Patent Publication No. 2009-08917 describes a power plug locking device that prohibits unauthorized removal of the power plug from the vehicle.

The power supply locking device of the '917 publication switches from a lock state to an unlock state when the vehicle doors are unlocked.

SUMMARY

However, when the power plug locking device is in the lock state and the vehicle doors are unlocked, to return the power plug locking device to the unlock state, the unlocked vehicle doors must first be locked and then unlocked. This is burdensome. Further, the person charging the battery may wish to unlock the vehicle doors while keeping the power plug locking state in the lock state. However, the power plug locking device is automatically switched to the unlock state when the vehicle doors are unlocked.

One aspect of the present invention is a power plug locking device arranged in a vehicle. The power plug locking device includes a lock member moved between a lock position, in which the lock member prohibits removal of a power plug from a vehicle inlet, and an unlock position, in which the lock member permits removal of the power plug from the vehicle inlet. A drive source is activated to move the lock member from the lock position to the unlock position. An unlock switch is manually operated to move the lock member to the unlock position. An unlock circuit that activates the drive source to move the lock member to the unlock position when the operation of the unlock switch and an unlock state of a vehicle door are both detected.

Another aspect of the present invention is a power plug lock device used with a vehicle inlet connected to a power plug that supplies a vehicle with power. The power plug lock device includes a lock member moved between a lock position, which prohibits removal of the power plug from the vehicle inlet, and an unlock position, which permits removal of the power plug from the vehicle inlet. A drive source is activated when the lock member is moved from the lock position to the unlock position. An unlock switch outputs an unlock signal when the lock member is manually moved to the unlock position. An unlock circuit, which is coupled to the unlock switch and the drive source, activates the drive source to move the lock member to the unlock position upon receipt of the unlock signal from the unlock switch when a vehicle door is unlocked.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a perspective view illustrating a power plug and an inlet;

FIGS. 3A and 3B are side views, partially in cross-section, illustrating the power plug and the inlet;

FIG. 6 is a side view illustrating the power plug locking device in an unlock state;

FIGS. 7A and 7B are a side view and a front view illustrating a lock mechanism in the unlock state;

FIG. 10A is a perspective view illustrating a rotation member in the lock state;

FIG. 10B is a perspective view illustrating the rotation member when the lock state is switched to the unlock state; and FIGS. 11A, 11B, and 11C are schematic diagrams illustrating a power plug locking device according to a second embodiment of the present invention.

DESCRIPTION OF THE EMBODIMENTS

A power plug locking device according to one embodiment of the present invention will now be described.

Figure 1:
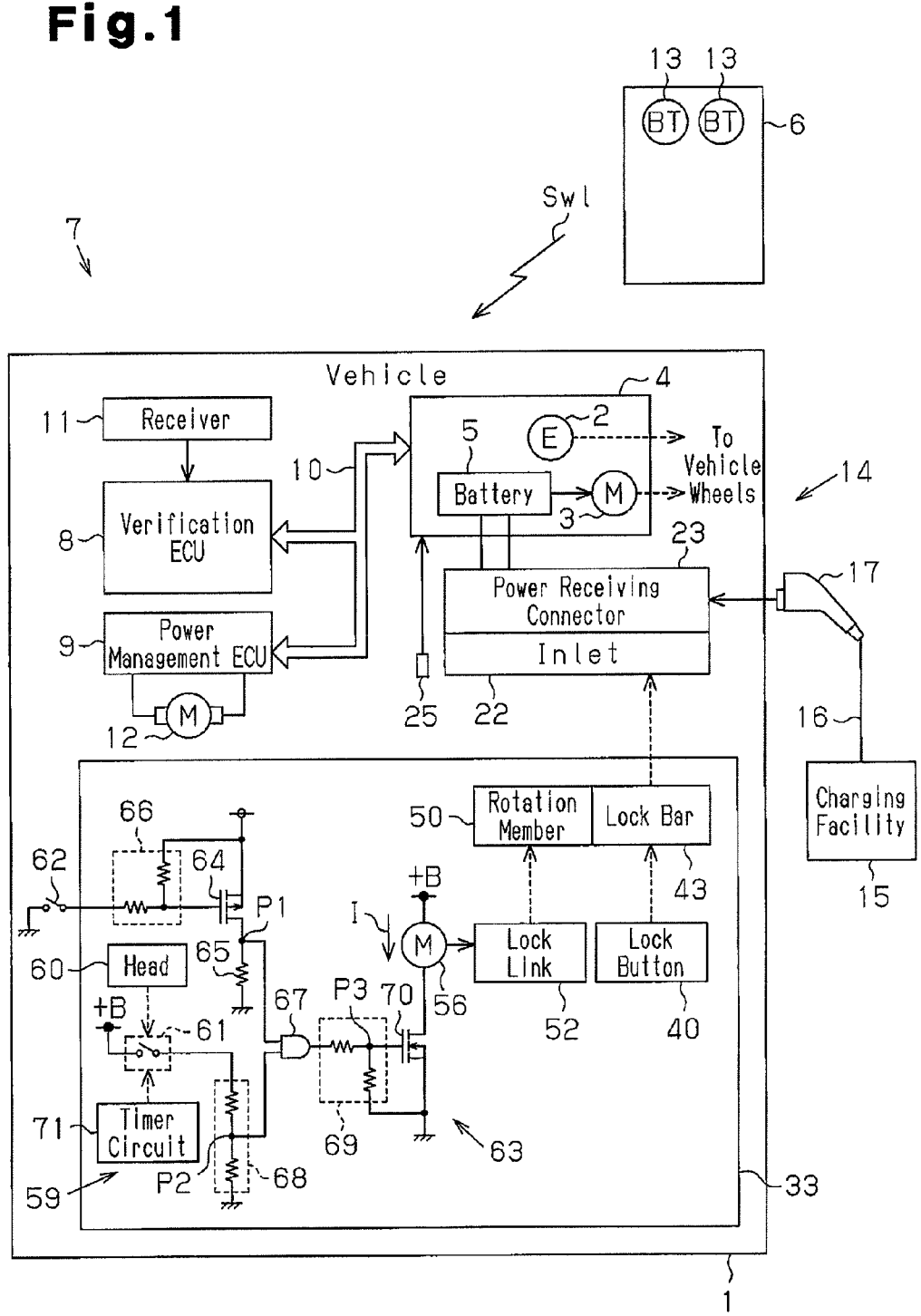
FIG. 1 is a block diagram illustrating a vehicle including a power plug locking device according to a first embodiment of the present invention.

With reference to FIG. 1, a hybrid vehicle 1 includes a hybrid system 4 that uses an engine 2 and a motor 3 to generate power that rotates the vehicle wheels. The hybrid system 4 includes a battery 5 that serves as a power supply for the motor 3. The vehicle 1 is operated in various modes, such as a mode in which the vehicle 1 is driven by the motor 3 while generating power with the engine 2, a mode in which the vehicle 1 is driven by both the engine 2 and the motor, and a mode in which the vehicle 1 is driven by only the motor 3.

A wireless key system 7 is installed in the vehicle 1. The wireless key system 7 performs ID verification to lock and unlock the vehicle doors when receiving a signal from a wireless key 6. In one example, the wireless key system 7 includes a verification electronic control unit (ECU) 8, which verifies an ID code of the wireless key 6, and a power management ECU 9, which manages the power for various electric devices in the vehicle 1. The ECUs 8 and 9 are connected by an in-vehicle bus 10 to the hybrid system 4. The verification ECU 8 is connected to a receiver 11 that receives radio waves in the ultra-high frequency (UHF) band. A door lock motor 12 is connected to the power management ECU 9. The door lock motor 12 serves as a drive source for a door locking device that locks and unlocks a vehicle door.

The wireless key 6 includes buttons 13. When any one of the buttons 13 is operated, the wireless key 6 transmits a wireless signal Sw1, which is in accordance with the operated button 13, on the UHF radio wave. The wireless signal Sw1 includes the ID code of the wireless key 6 and a function code of the operated button 13. The verification ECU 8 performs ID verification (wireless verification) on the ID code in the wireless signal Sw1 received in the receiver 11. When the verification is successful, the verification ECU 8 locks or unlocks the vehicle doors with the power management ECU 9.

The vehicle 1 includes a charge system 14 that charges the battery 5 with an external power supply. The external power supply may be a charging facility 15, such as a charging station or a household commercial power supply. Further, the charge system 14 includes a power plug 17, which is arranged on a distal end of a charge cable 16 extending from the charging facility 15. The charge system 14 charges the battery 5 through the power plug 17 that is connected to the vehicle 1.

As illustrated in FIG. 2, a vehicle body 18 of the vehicle 1 includes a lid 20 that covers a power port 19. The power port 19 includes an accommodation box 21. The lid 20 and various components of the power port 19 are arranged in the accommodation box 21.

An inlet 22, which receives the power plug 17, is coupled by fasteners (not illustrated) to a generally central part of the accommodation box 21. The inlet 22 includes a central hole 24. A power receiving connector 23 extending from the vehicle body 18 is arranged in the central hole 24. The power receiving connector 23 includes a plurality of terminals (power terminals, control terminals, and the like). Referring to FIG. 1, the inlet 22 includes a plug connection detection sensor 25 that detects complete fitting of the power plug 17 to the power receiving connector 23.

Referring to FIGS. 3A and 3B, the power plug 17 includes power supplying terminals of the charge system 14. The terminals of the power plug 17 are electrically connected to the terminals of the power receiving connector 23. The power plug 17 includes a plug body 26. A pivotal lock arm 27 is coupled to the plug body 26. The lock arm 27 includes a distal hook 28 and a basal arm operation portion 29, which are exposed from the plug body 26. An urging member 30 is arranged near the arm operation portion 29 to constantly urge the lock arm 27 in a closing direction.

To connect the power plug 17 to the power receiving connector 23, the power plug 17 is fitted straight into the power receiving connector 23. A catch 31 including a sloped surface 32 is formed on an upper portion of the inlet 22. As the hook 28 comes into contact with the catch 31, the sloped surface 32 guides the lock arm 27 and moves the lock arm 27 upward. When the power plug 17 is completely fitted to the inlet 22, the urging force of the urging member 30 lowers and closes the lock arm 27. This hooks the hook 28 to the catch 31 and prevents separation of the power plug 17 from the inlet 22.

When the hybrid system 4 determines with the plug connection detection sensor 25 that the power plug 17 has been connected, the hybrid system 4 starts charging the battery 5 with the power plug 17 (charging facility 15). When the hybrid system 4 determines that the battery 5 has been fully charged, the hybrid system 4 stops delivering power with the power plug 17. To remove the power plug 17 from the power receiving connector 23 after the charging ends, the arm operation portion 29 is pushed to open and release the lock arm 27 from the catch 31. In this state, the power plug 17 is pulled out straight from the power receiving connector 23 and removed from the vehicle 1.

Figure 4:
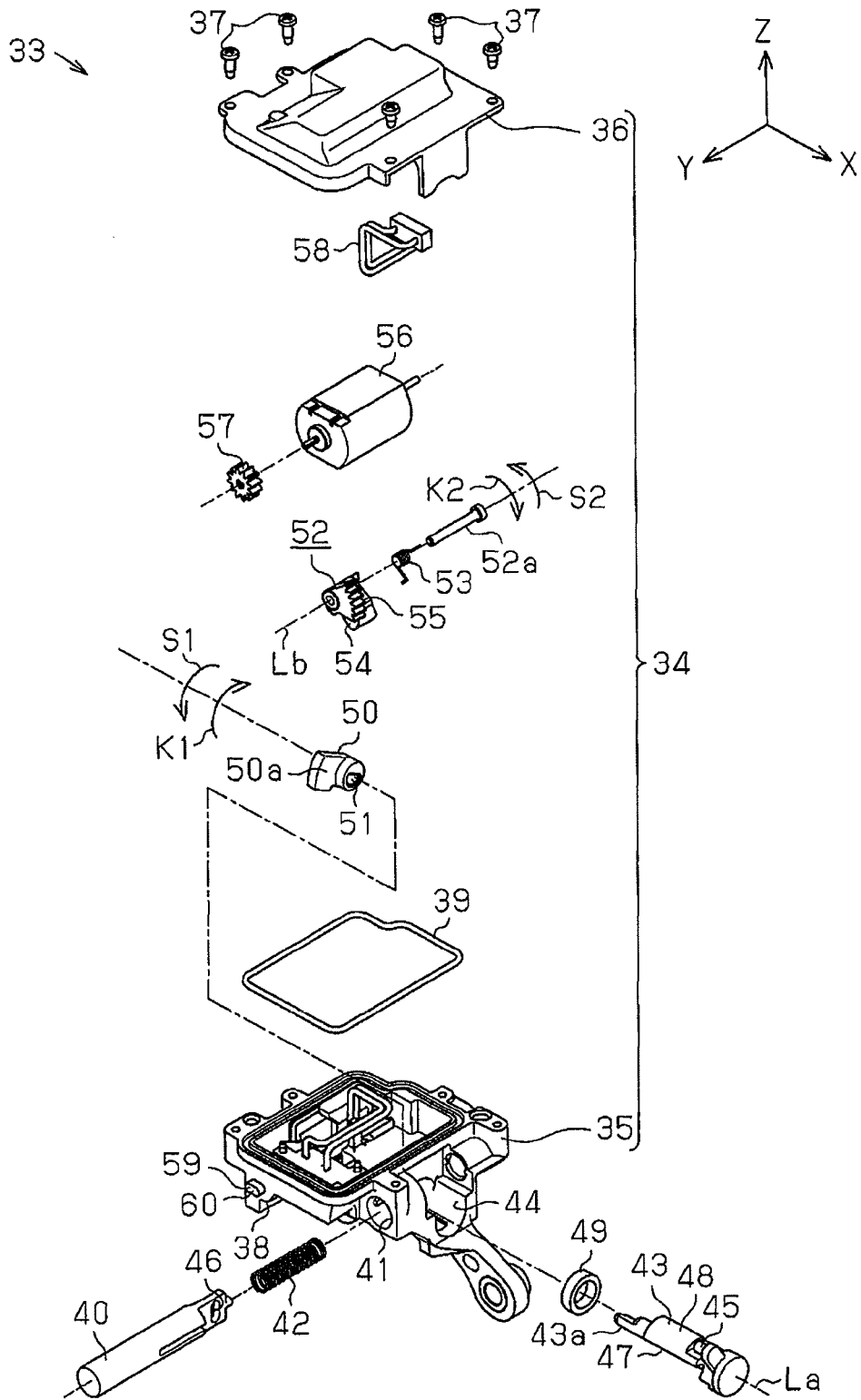
FIG. 4 is an exploded perspective view of the power plug locking device.
Figure 5:
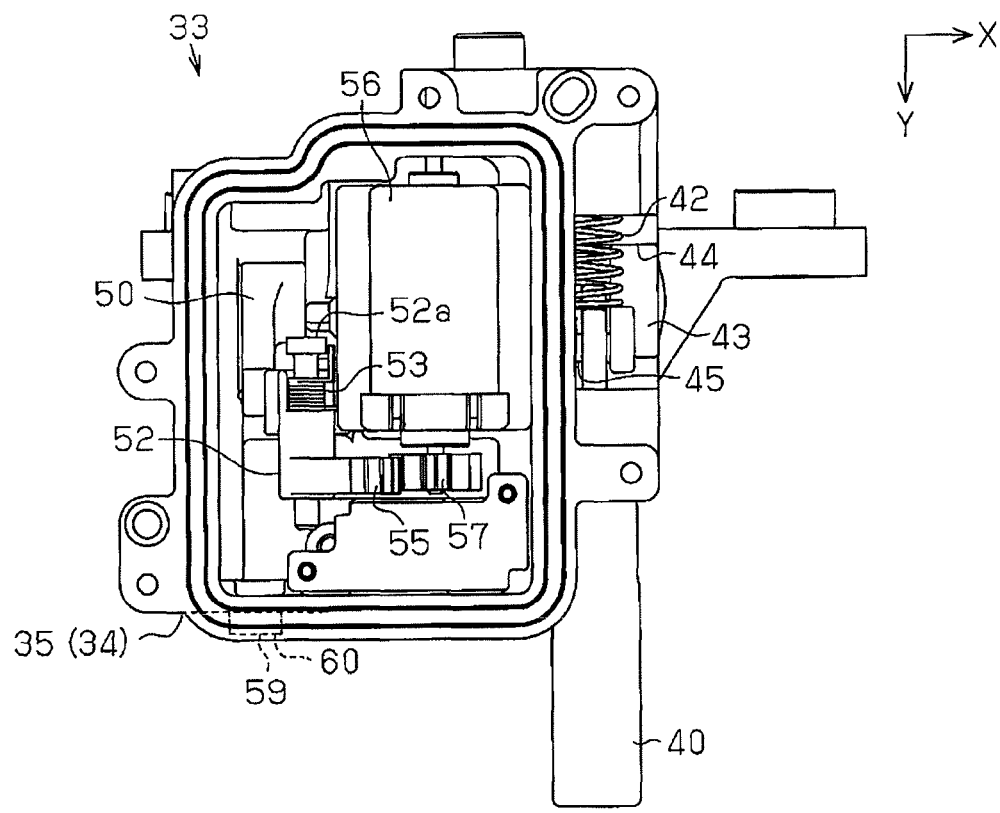
FIG. 5 is a plan view illustrating the layout of components in the power plug locking device.

Referring to FIGS. 4 and 5, the accommodation box 21 in the power port 19 includes a power plug locking device 33 that prevents unauthorized removal of the power plug 17 from the power receiving connector 23. The power plug locking device 33 is operated when a manual lock operation is performed to switch to a lock state and when a vehicle door unlock operation and a manual unlock operation are performed to switch to an unlock state.

The power plug locking device includes a box-shaped case 34. The case 34 accommodates components of the power plug locking device 33. In the illustrated example, the case 34 includes a box-shaped lock body 35, a plate-shaped cover 36, and fasteners 37, which fasten the lock body 35 and the cover 36. The lock body 35 is fastened to the accommodation box 21. This fixes the power plug locking device 33 to the accommodation box 21. A recess 38 is arranged in a front side of the lock body 35 to allow for the passage of the lock arm 27 when the power plug 17 is connected to and removed from the inlet 22.

A seal 39 is arranged between the lock body 35 and the cover 36 to hermetically seal the interior of the case 34. The seal 39 is, for example, an O-ring.

A cylindrical lock button 40, which is operated when switching to a lock state, is coupled to the front side of the lock body 35. The lock button 40 is fitted into a button socket 41 formed in the lock body 35. The lock button 40 is linearly movable and has a distal end exposed from the lock body 35. An urging member 42 is arranged between a basal end of the lock button 40 and an inner wall of the lock body 35 to outwardly urge the lock button 40. The urging member 42 is, for example, a coil spring. The lock button 40 forms a lock operation member.

A generally cylindrical lock bar 43 is coupled to the lock button 40 to prohibit opening of the lock arm 27. The lock bar 43 is rotatable about its axis La. The lock body 35 includes a lock bar socket 44, which receives the lock bar 43 extending in a sideward direction as viewed in FIG. 4. The lock bar 43 includes a basal end arranged in the case 34 and a distal end arranged outside the case 34. The distal end of the lock bar 43 includes a hooking pin 45, which is engaged with an elongated hole 46 arranged on the lock button 40. The elongated hole 46 and the hooking pin 45 convert the linear motion of the lock button 40 into rotational motion of the lock bar 43 about the axis La. The lock bar 43 corresponds to a lock member.

Figure 8:
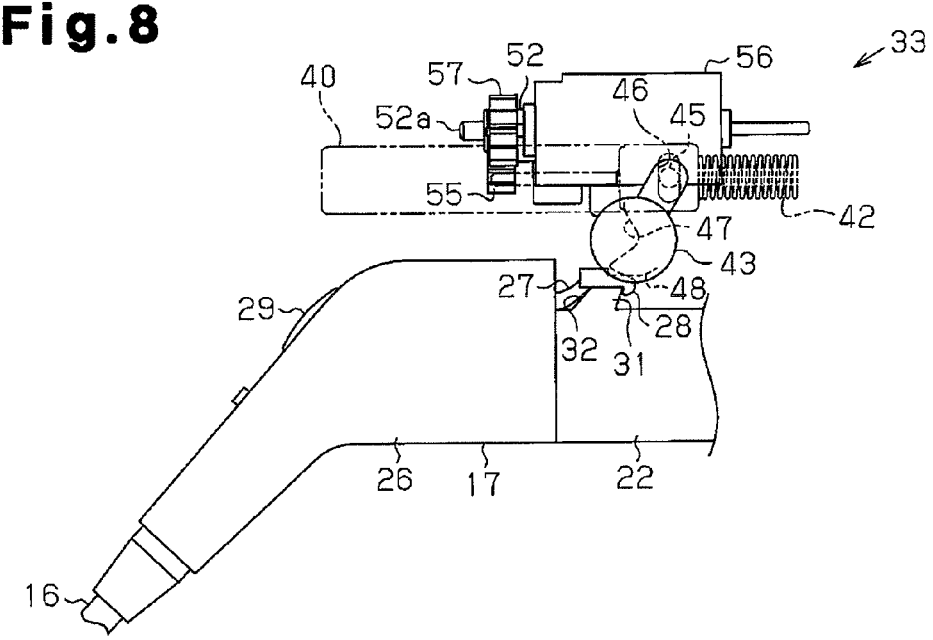
FIG. 8 is a side view illustrating the power plug locking device in a lock state.

The lock bar 43 includes a cutout 47 formed by cutting out a triangular part from the lock bar 43. As illustrated in FIGS. 6 and 7, when the cutout 47 of the lock bar 43 faces the upper surface of the lock arm 27, the lock bar 43 permits opening of the lock arm 27 (unlock state). As illustrated in FIGS. 8 and 9, when the part of the lock bar 43 excluding the cutout 47, namely, a cylindrical wall 48, faces the upper surface of the lock arm 27, the lock bar 43 prohibits opening of the lock arm 27 (lock state).

As illustrated in FIG. 4, a seal 49 is arranged between the lock bar 43 and the lock bar socket 44 to hermetically seal the interior of the case 34. The seal 49 is, for example, an annular lip seal.

A rotation member 50, which rotates integrally with the lock bar 43, is coupled to the basal end of the lock bar 43. The rotation member 50 includes a triangular plate, which extends in a direction intersecting the axis La of the lock bar 43, and a D-shaped coupling groove 51. The coupling groove 51 receives an engagement projection 43a of the lock bar 43. This integrates the rotation member 50 with the lock bar 43. The lock button 40 is pushed toward a retracted position to rotate the rotation member 50 with the lock bar 43 in a lock direction (direction of arrow K1 in FIG. 3). When the lock button 40 is moved toward a projected position, the rotation member 50 rotates with the lock bar 43 in an unlock direction (direction of arrow S1 in FIG. 4).

A lock link 52 is arranged in the case 34 to cooperate with the rotation member 50 and hold the lock bar 43 at a lock position. The lock link 52 is supported by a link pin 52a pivotally about the axis Lb of the link pin 52a. As illustrated in FIG. 4, pivoting directions of the lock link 52 (S2 and K2) intersect with the pivoting directions of the rotation member 50 (S1 and K1). An urging member 53 is coupled to the lock link 52 to constantly urge the lock link 52 in a lock direction. The urging member 53 is, for example, a torsion spring. The lock link 52 is pivoted in the lock direction (direction of arrow K2 in FIG. 4) by the urging force of the urging member 53 and pivoted in the unlock direction (direction of arrow S2 in FIG. 4) against the urging force of the urging member 53. The lock link 52 corresponds to a link member.

Figure 9A:
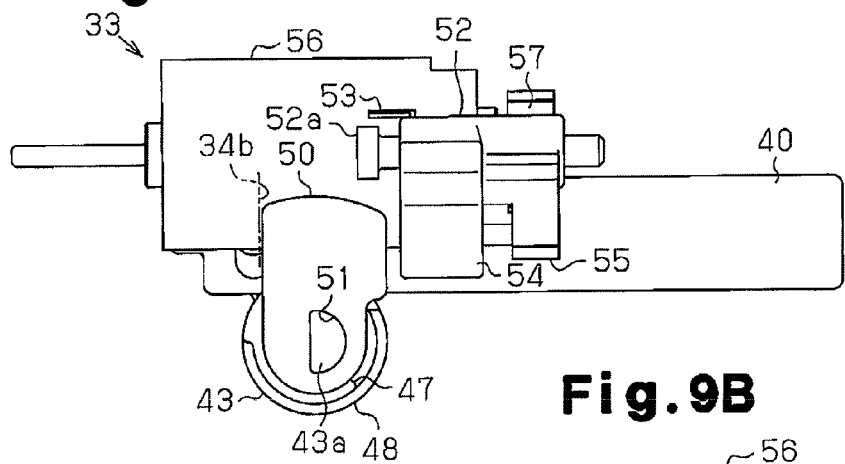
FIGS. 9A and 9B are a side view and a front view illustrating the lock mechanism in the lock state.
Figure 9B:
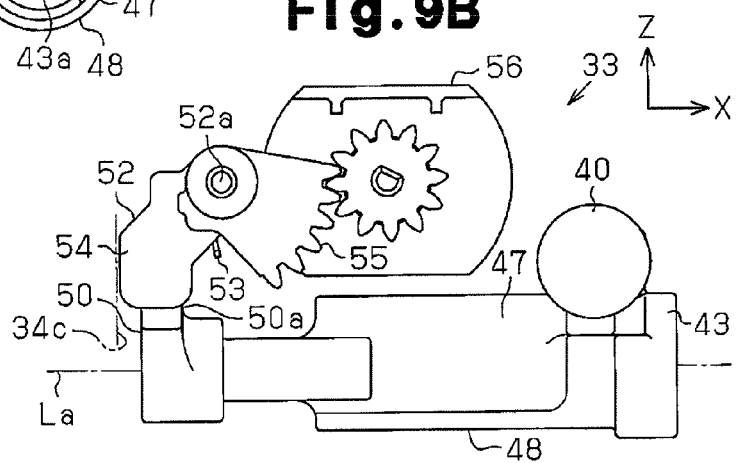

The lock link 52 includes a restriction portion 54, which restricts pivoting of the rotation member 50 in the unlock direction caused by the urging member 42. As illustrated in FIGS. 9A and 9B, when the lock button 40 is pushed and the rotation member 50 is pivoted in the lock direction, the lock link 52 is released from the rotation member 50 and pivoted in the lock direction by the urging force of the urging member 53. In this state, the restriction portion 54 is arranged between the case 34 and the rotation member 50 to hold the lock bar 43 in a lock state. The lock link 52 includes a gear 55 located on the opposite side of the restriction portion 54. The gear 55 includes teeth that are arranged in the rotation direction of the lock link 52.

As illustrated in FIGS. 4 to 9, the gear 55 is coupled to a power plug lock motor 56. The power plug lock motor 56 is driven when the lock bar 43 is switched between a lock state and an unlock state. The power plug lock motor 56 includes a motor shaft arranged in a Y axis direction. A gear 57, which is arranged on a distal end of the motor shaft, is engaged with the gear 55 of the lock link 52. The power plug lock motor 56 may be a DC motor connected, for example, by a harness 58 to a power supply +B of the vehicle 1. When the power plug lock motor 56 produces rotation, the lock link 52 rotates in a direction opposite to the rotation direction of the power plug lock motor 56. The power plug lock motor 56 corresponds to a drive source.

As illustrated in FIGS. 1, 2, 4, and 5, an unlock switch 59 is arranged in the front side of the lock body 35. The unlock switch 59 is operated to switch the power plug locking device 33 to an unlock state. The unlock switch 59 includes a head 60, which is exposed to the exterior from the case 34, and a switch contact 61, which is accommodated in the case 34. When the unlock switch 59 is pushed in a state in which the vehicle doors are unlocked, the power plug locking device 33 is switched from a lock state to an unlock state.

As illustrated in FIG. 1, a door lock position switch 62 is arranged in the vehicle body 18 to detect whether the vehicle doors are locked or unlocked. When the wireless key 6 unlocks the vehicle doors through remote control and when a mechanical key mechanically unlocks the vehicle doors, the door lock position switch 62 is activated. The door lock position switch 62 corresponds to a door sensor.

The power plug locking device 33 includes an activation circuit 63 that performs an unlock operation with the power plug locking device 33 when the unlocked state of the vehicle doors and the operation of the unlock switch 59 are both detected. The activation circuit 63 includes a first switching element 64, which is formed by, for example, a field effect transistor (FET). The first switching element 64 includes a source terminal connected to the power supply +B, a drain terminal connected by a resistor 65 to ground, and a gate terminal connected by a voltage division circuit 66 to the door lock position switch 62. The activation circuit 63 corresponds to an unlock circuit.

The activation circuit 63 includes an AND circuit 67. The AND circuit 67 includes one input terminal connected by the first switching element 64 to the door lock position switch 62 and another input terminal connected by a voltage dividing circuit 68 to the unlock switch 59. In the illustrated example, one input terminal of the AND circuit 67 is connected to a node P1 between the resistor 65 and the drain terminal of the first switching element 64, and the other input terminal of the AND circuit 67 is connected to a node P2 between resistors in the voltage dividing circuit 68.

The output terminal of the AND circuit 67 is connected by a voltage dividing circuit 69 to a second switching element 70. The second switching element 70 includes a drain terminal connected to the power plug lock motor 56, a source terminal connected to ground, and a gate terminal connected to a node P3 between resistors in the voltage dividing circuit 69.

The unlock switch 59 includes a timer circuit 71 that sets the ON time of the unlock switch 59. When the state in which the head 60 is pushed reaches the ON time, the timer circuit 71 ends the ON state of the unlock switch 59. In a preferred example, the timer circuit 71 activates the switch contact 61 after sufficient time for ending the unlock operation of the power plug locking device 33 elapses from when the head 60 is pushed.

The operation of the power plug locking device 33 will now be described with reference to FIGS. 6 to 10.

The unlock state of the power plug locking device 33 will now be described with reference to FIGS. 6 and 7. When the power plug locking device 33 is in the unlock state, the lock button 40 is located at an initial state projected from the case 34 by the urging force of the urging member 42. Further, the cutout of the lock bar 43 faces the catch 31 (unlock position), and the lock arm 27 is pivotal. In this state, a user can connect the power plug 17 to the inlet 22 and remove the power plug 17 from the inlet.

As illustrated in FIGS. 7A and 7B, when the lock bar 43 is arranged at the unlock position, the rotation member 50 is located at an unlock position in contact with an inner wall 34a of the case 34. In this case, the restriction portion 54 of the lock link 52 is supported by a triangular wall surface 50a of the rotation member 50. This restricts rotation of the rotation member 50 in the lock direction and holds the power plug locking device 33 in the unlock state.

After the power plug 17 is connected to the inlet 22, to switch the power plug locking device 33 from the unlock state to the lock state, the user pushes the lock button 40, which is located at the initial position, against the urging force of the urging member 42. The pushing of the lock button 40 integrally pivots the lock bar 43 and the rotation member 50 in the lock direction (direction of arrow K1 in FIG. 7A).

Referring to FIG. 9, when the lock button 40 is pushed until the rotation member 50 contacts the inner wall surface 34b of the case 34, the lock bar 43 is rotated by about 60 degrees. In this state, the cylindrical wall 48 of the lock bar 43 faces the upper surface of the lock arm 27. Thus, the lock bar 43 restricts the opening of the lock arm 27, which is hooked to the catch 31. In this manner, the power plug locking device 33 is in a lock state and the power plug 17 is fixed to the inlet 22.

When the rotation member 50 is rotated to the lock position, the lock link 52 is released from the wall surface 50a of the rotation member 50. Thus, the urging force of the urging member 53 rotates the lock link 52 in the lock direction (direction of arrow K2 in FIG. 7(b)).

Referring to FIG. 9(b), when the lock link 52 is rotated by about 45 degrees and the restriction portion 54 comes into contact with the inner wall surface 34c of the case 34, the lock link 52 is arranged between the case 34 and the rotation member 50. The lock link 52 disables rotation of the rotation member 50. Thus, the power plug locking device 33 is held in a lock state.

Then, when, for example, the charging of the battery 5 ends, to switch the power plug locking device 33 from the lock state to the unlock state, the user unlocks the vehicle doors through remote control with the wireless key 6 or a mechanical operation with the mechanical key (not illustrated). When the vehicle doors are unlocked, the door lock position switch 62 is activated, the first switching element 64 is activated, and the level of the switch signal provided to one of the input terminals of the AND circuit 67 shifts to an H level.

After the vehicle doors are unlocked, the user pushes the unlock switch 59. This shifts the signal level of the switch signal provided to the other input terminal of the AND circuit 67 to an H level. Thus, the AND circuit 67 outputs an H level output signal from the output terminal. The H level output signal activates the second switching element 70 so that current I flows to the power plug lock motor 56. Thus, the power plug lock motor 56 produces rotation.

Referring to FIGS. 10A and 10B, the rotation of the power plug lock motor 56 is transmitted by the gears 55 and 57 to the lock link 52, and the lock link 52 starts to rotate against the urging force of the urging member 53 in the unlock direction (direction of arrow S2 in FIG. 10A). The lock link 52 rotates until coming into contact with the inner wall surface 34d of the case 34.

Referring to FIG. 10B, when the lock link 52 is rotated in the unlock direction to a release position, the rotation member 50 is released from the lock link 52, which has been restricting the position of the rotation member 50. Thus, the urging force of the urging member 42 starts to rotate the rotation member 50 in the unlock direction (direction of arrow S1 in FIG. 10(b)) with the lock bar 43. The rotation of the rotation member 50 in the unlock direction rotates the lock bar 43 to the unlock position and returns the lock button 40 to the initial position. This returns the power plug locking device 33 to the unlock state.

In this manner, when the unlocking of the vehicle doors and the pushing of the unlock switch 59 are both detected, the power plug locking device 33 switches to the unlock state. Thus, the power plug locking device 33 is not simply switched to the unlock state when the vehicle doors are unlocked. Rather, the unlock switch 59 is pushed in a state in which the vehicle doors are unlocked to switch the power plug locking device 33 to the unlock state.

As a result, when switching the power plug locking device 33 to the lock state in a state in which the vehicle doors are unlocked, the user does not have to go to the trouble of locking the vehicles doors and then unlocking the vehicle doors again. The user just operates the unlock switch 59 to switch the power plug locking device 33 to the unlock state. Further, as long as the power plug locking device 33 is in a locked state, even if the vehicle doors are unlocked, the power plug locking device 33 does not perform an unlock operation. Thus, the power plug locking device 33 is not switched to the unlock state unless the user intends to do so.

(1) In the illustrated example, the power plug locking device 33 switches to the unlock state when the activation circuit 63 detects that the vehicle doors are unlocked and, at the same time, the unlock switch 59 has been pushed. Thus, the power plug locking device 33 is unlocked when the user intends to do so.

(2) In the illustrated example, the power plug locking device 33 is switched to the lock state when the lock button 40 is manually operated. Thus, the power plug locking device 33 is locked when the user intends to do so.

(3) In the illustrated example, the activation circuit 63, which drives the power plug lock motor 56 in accordance with the switch signals provided from the door lock position switch 62 and the unlock switch 59, is a simple hardware including the AND circuit 67 and the switching elements 64 and 70. Thus, the power plug locking device 33 has a relatively simple structure.

(4) When the lock button 40 is pushed and the lock bar 43 is rotated in the lock direction, the lock link 52, which has been supported by the rotation member 50 from beside, is released from the rotation member 50. Then, the urging force of the urging member 53 moves the lock link 52 in the lock direction into between the case 34 and the rotation member 50. This switches the power plug locking device 33 to the lock state. In this manner, the power plug locking device 33 is switched to the lock state through a mechanical operation. This ensures that the power plug locking device 33 switches to the lock state.

The second embodiment will now be described centering on differences from the first embodiment. The second embodiment differs from the first embodiment in that the lock operation and unlock operation both use the same lock button 40. Otherwise, the second embodiment is basically the same as the first embodiment.

Referring to FIG. 11, the unlock switch 59 (may be only the switch contact 61), which detects an unlock operation, is arranged in the case 34 where it contacts the pushed lock button 40. In another example, the lock button 40 may include a holding mechanism 81 that holds the lock button 40 at a lock position. The holding mechanism 81 temporarily holds the lock button 40, which is pushed from the initial position, at the lock position. When the lock button 40 is further pushed from the lock position, the holding mechanism 81 allows for the lock button 40 to move to an over-stroke position.

Referring to FIG. 11A, when switching the power plug locking device 33 to the lock state, the user pushes the lock button 40 from the initial position. This pivots the rotation member 50 and the lock link 52 and switches the power plug locking device 33 to the lock state. Referring to FIG. 11B, when the power plug locking device 33 is switched to the lock state, the lock button 40 reaches the lock position. The holding mechanism 81 holds the lock button 40 at the lock position.

Referring to FIG. 11B, when switching the power plug locking device 33 to the unlock state from the lock state, the user pushes the lock button 40 further from the lock position. When the lock button 40 reaches the over-stroke position, the lock button 40 activates the unlock switch 59 (switch contact 61). In this case, when the vehicle doors are unlocked, the power plug locking device 33 switches to the unlock state. Further, when the lock button 40 reaches the over-stroke position, the holding mechanism 81 releases the lock button 40. This returns the lock button 40 to the initial position.

Figure 12A:
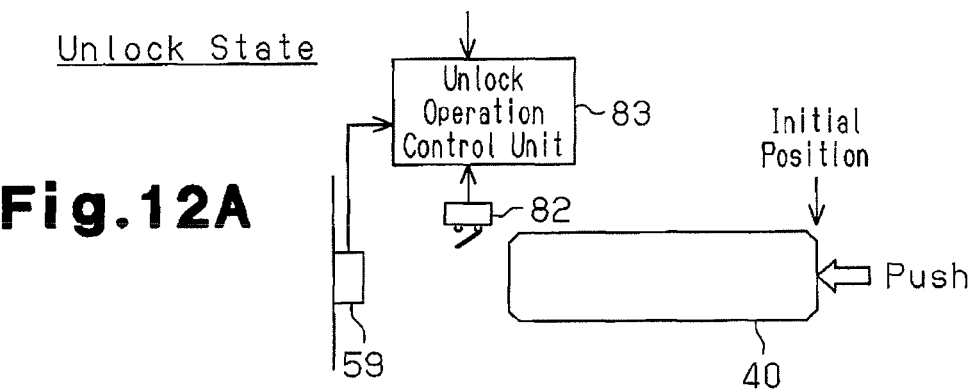
FIGS. 12A and 12A are schematic diagrams illustrating a power plug locking device of another example.
Figure 12B:
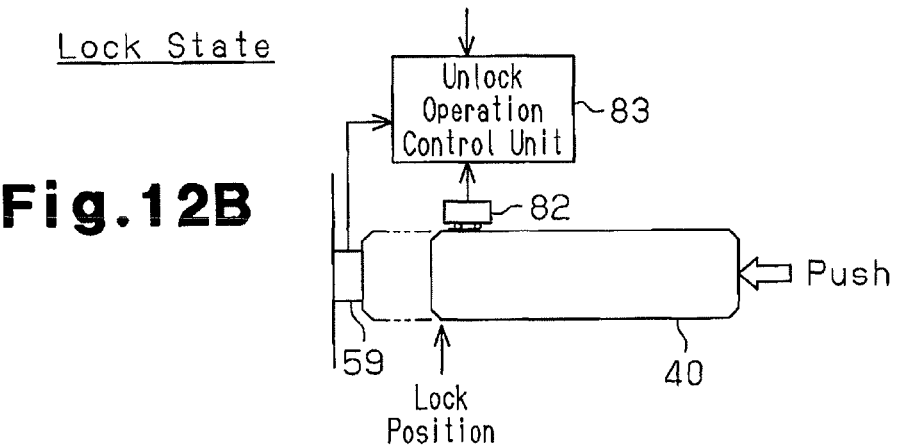

FIGS. 12A and 12B illustrate an example that includes a push operation detection switch 82 that detects whether the lock button 40 is located at the lock position. The push operation detection switch 82 may be arranged, for example, along the path of the lock button 40. The push operation detection switch 82 is also referred to as a switch that detects whether the power plug locking device 33 is in the lock state.

In the examples of FIGS. 12A and 12B, the power plug locking device 33 includes an unlock operation control unit 83 that controls unlock operations. The unlock operation control unit 83 controls the unlock operation of the power plug locking device 33 in accordance with switch signals from the door lock position switch 62, the unlock switch 59, and the push operation detection switch 82. The unlock operation control unit 83 monitors the elapsed time from when the push operation detection switch 82 is activated to when the unlock switch 59 is activated to control the unlock operation.

When switching the power plug locking device 33 to the lock state, the user pushes the lock button 40, which is located at the initial position as illustrated in FIG. 12A. The push operation detection switch 82 is activated. However, the unlock switch 59 is not immediately activated afterward. Thus, when an ON signal is not received from the unlock switch 59 within a predetermined time from when an ON signal is received from the push operation detection switch 82, the unlock operation control unit 83 determines that a lock operation has been performed. In this case, the unlock operation control unit 83 does not permit activation of the power plug lock motor 56 and permits switching to the lock state.

When switching the power plug locking device 33 to the unlock state, the user further pushes the lock button 40 from the lock position illustrated in FIG. 12B. This activates the unlock switch 59 with the lock button 40. The unlock operation control unit 83 receives an ON signal from the push operation detection switch 82 and an ON signal from the unlock switch 59. Thus, the unlock operation control unit 83 determines that an unlock operation has been performed. In this case, the unlock operation control unit 83 permits activation of the power plug lock motor 56 and permits switching to the unlock state.

In addition to advantages (1) to (4) of the first embodiment, the second embodiment has the following advantage.

(5) The same lock button 40 is used in a lock operation and an unlock operation. This reduces component costs of the power plug locking device 33 and allows for miniaturization of the power plug locking device 33.

It should be apparent to those skilled in the art that the present invention may be embodied in many other specific forms without departing from the spirit or scope of the invention. Particularly, it should be understood that the present invention may be embodied in the following forms.

The condition for starting the charging of the battery 5 can be changed. For example, charging may be started when the plug connection detection sensor 25 detects fitting of the power plug 17 to the power receiving connector 23 and the ID verification of the wireless key 6 is successful.

The charging of the battery 5 may be stopped by a switch arranged in the vehicle.

The electronic key system is not limited to the wireless key system 7. For example, the electronic key system may be a key-operation-free system, which performs ID verification by performing narrow range communication (communication range of several meters) when receiving a signal from the vehicle 1, or a near field communication verification system, which performs near field communication.

The wireless key system 7 may be a power slide door system.

The unlock switch 59 is not limited to a push type switch and may be, for example, a slide switch, which includes a slideable knob, or a rotary switch, which includes a rotational knob.

The lock member is not limited to a single component like the lock bar 43 and may be, for example, a mechanical assembly formed by a plurality of components.

The drive source is not limited to a motor and may be, for example, a solenoid.

The unlock switch 59 (switch contact 61) and the door lock position switch 62 do not have to be of a contact type and may be of a non-contact type, such as a magnetic sensor or an optical sensor.

The power plug locking device 33 does not have to be manually switched to the lock state. For example, the power plug locking device 33 may be switched to the lock state when the vehicle doors are locked.

The lock member is not limited to a rotatable cylindrical member like the lock bar 43. For example, the lock member may be a pivotal triangular member. Further, the lock member may be a member that slides linearly.

The structure of the power plug locking device 33 is not limited to that described in the above embodiments and may be varied as long as it switches to an unlock state when the unlocking of a vehicle door and the manual operation of an unlock switch are both detected.

The vehicle is not limited to a hybrid vehicle and may be, for example, an electric vehicle powered by a motor.

The unlock circuit is not limited to the activation circuit formed by electric elements (AND circuits, resistors, switching elements, etc.). For example, the unlock circuit may be a control circuit (integrated circuit) that includes a CPU or the like and controls the power plug lock motor 56.

The signal provided to one terminal of the AND circuit is not limited to the detection signal from the door lock position switch 62 as long as the signal indicates whether a vehicle door is locked or unlocked.

The present examples and embodiments are to be considered as illustrative and not restrictive, and the invention is not to be limited to the details given herein, but may be modified within the scope and equivalence of the appended claims.

The invention claimed is:

1. A power plug locking device arranged in a vehicle, the power plug locking device comprising:
    a lock member moved between a lock position, in which the lock member prohibits removal of a power plug from a vehicle inlet, and an unlock position, in which the lock member permits removal of the power plug from the vehicle inlet;
    a drive source activated to move the lock member from the lock position to the unlock position;
    an unlock switch manually operated to move the lock member to the unlock position; and
    an unlock circuit that activates the drive source to move the lock member to the unlock position when the operation of the unlock switch and an unlock state of a vehicle door are both detected.

2. The power plug locking device according to claim 1, further comprising a lock operation member manually operated when switching the power plug locking device to a lock state, wherein the manual operation of the lock operation member mechanically moves the lock member to the lock position.

3. The power plug locking device according to claim 1, wherein the unlock circuit includes an AND circuit that receives a switch signal from the unlock switch and a switch signal from a door sensor, which detects when the vehicle door is in the unlock state, and the unlock circuit drives the drive source in accordance with a signal output from the AND circuit when the two switch signals have levels indicating that the unlock switch has been operated and that the vehicle door is in the unlock state.

4. The power plug locking device according to claim 2, further comprising:

a rotation member rotated with the lock member;

a link member that contacts the rotation member to hold the lock member at the lock position; and an urging member that urges the link member in a lock direction, wherein the rotation member maintains the power plug locking device in the unlock state by restricting movement of the link member in the lock direction caused by the urging member when the lock member is located at the unlock position, and the rotation member permits movement of the link member when the lock member and the rotation member are manually operated and moved in the lock direction thereby maintaining the power plug locking device in the lock state as urging force of the urging member moves the link member in the lock direction into contact with the rotation member.

5. The power plug locking device according to claim 2, wherein the lock operation member activates the unlock switch.

6. The power plug locking device according to claim 1, wherein the lock member, when located at the lock position, is engaged with the power plug when the power plug is connected to the vehicle inlet, and the unlock circuit moves the lock member from the lock position to the unlock position by activating the drive source when the operation of the unlock switch and the unlock state of a vehicle door are both detected.

7. A power plug lock device used with a vehicle inlet connected to a power plug that supplies a vehicle with power, the power plug lock device comprising:

a lock member moved between a lock position, which prohibits removal of the power plug from the vehicle inlet, and an unlock position, which permits removal of the power plug from the vehicle inlet;

a drive source activated when the lock member is moved from the lock position to the unlock position;

an unlock switch that outputs an unlock signal when the lock member is manually moved to the unlock position; and an unlock circuit that is coupled to the unlock switch and the drive source and activates the drive source to move the lock member to the unlock position upon receipt of the unlock signal from the unlock switch when a vehicle door is unlocked.

\* \* \* \* \*